(No Model.) 2 Sheets—Sheet 1.

C. B. DE WEESE.
ELEVATING TRUCK.

No. 410,157. Patented Sept. 3, 1889.

Witnesses:
L. H. McComb.
N. C. DeWeese.

Inventor
Clinton Baily DeWeese.

(No Model.) 2 Sheets—Sheet 2.
C. B. DE WEESE.
ELEVATING TRUCK.
No. 410,157. Patented Sept. 3, 1889.
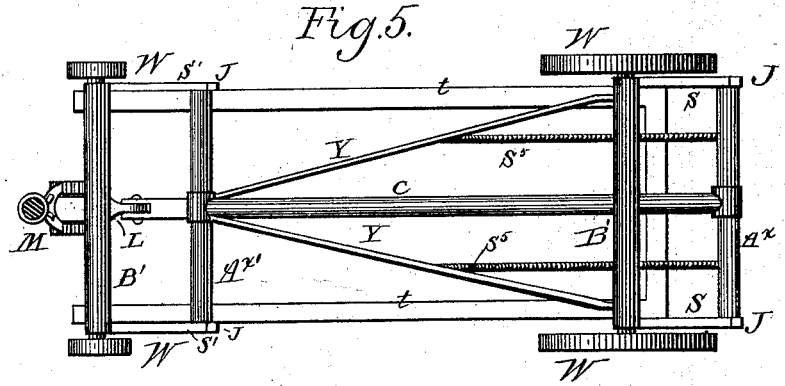
Fig. 5.
Fig. 6.
Fig. 7.
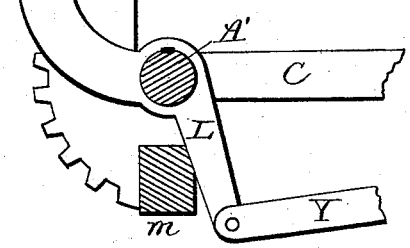
Fig. 8.
Fig. 9.
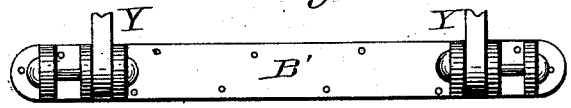
Fig. 10. Fig. 11.
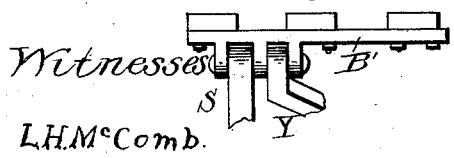
Witnesses
L. H. McComb.
N. C. DeWeese.
Inventor
Clinton Baily DeWeese

UNITED STATES PATENT OFFICE.

CLINTON BAILY DE WEESE, OF SIDNEY, OHIO.

ELEVATING-TRUCK.

SPECIFICATION forming part of Letters Patent No. 410,157, dated September 3, 1889.

Application filed April 26, 1889. Serial No. 308,762. (No model.)

*To all whom it may concern:*

Be it known that I, CLINTON BAILY DE WEESE, a citizen of the United States, residing at Sidney, in the county of Shelby and State of Ohio, have invented a new and useful Elevating-Truck, of which the following is a specification.

My invention relates to improvements in elevating-trucks in which a table T is supported above a wheeled truck on hinge-jointed standards, is elevated to a desired height when heavily loaded by a system of levers; and the objects of my invention are, first, to provide a low truck that may be easily loaded and wheeled to any desired point; second, to provide a leverage by which the load may be readily elevated to the height of a car-door or dray-bed, or any such elevation where it may be desired to unload from the truck, and, third, to afford facilities for the loading and unloading of heavy articles—such as heavy trunks, boxes of goods, &c.—and at the same time to lighten the labor of those engaged in such work. I attain these objects by the mechanism illustrated in the accompanying drawings, in which—

Figure 1:
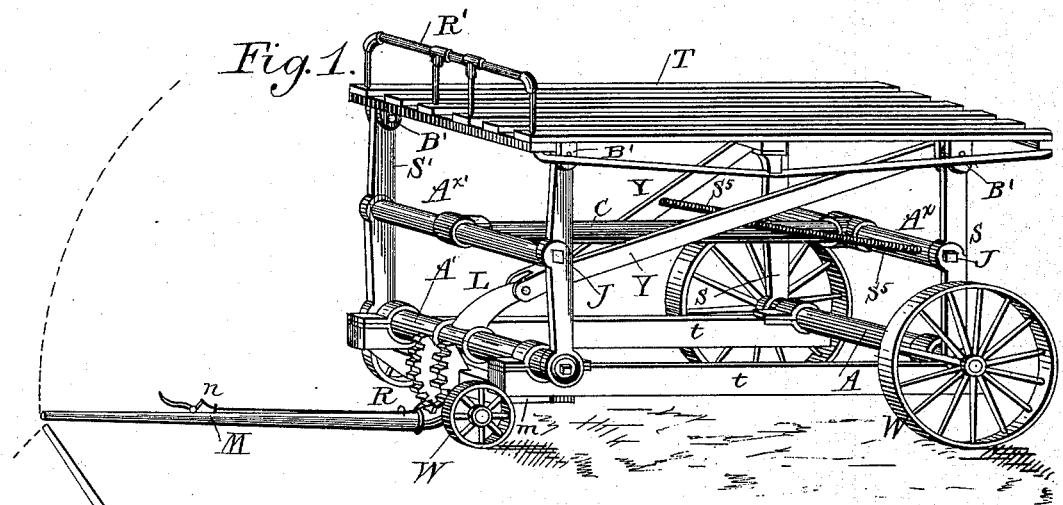
Figure 2:
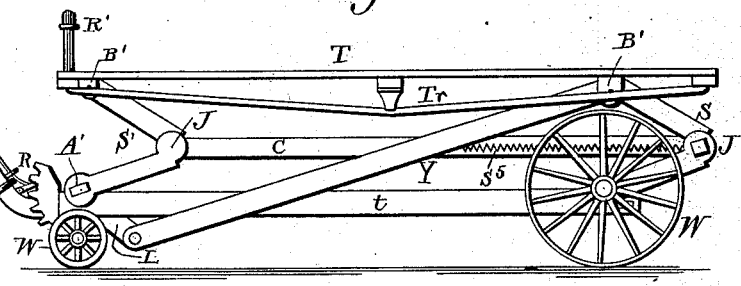
Figure 3:
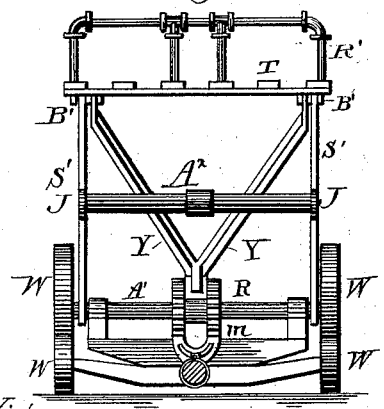
Figure 4:
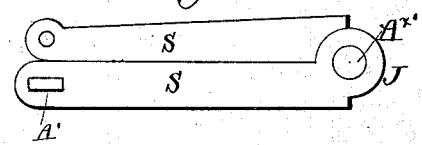

Figure 1 is an isometrical perspective. Fig. 2 is a side elevation. Fig. 3 is a front elevation. Fig. 4 is a standard, with hinge-joint drawn to a larger scale. Fig. 5, on Sheet 2, is a top view with bed removed. Fig. 6 is a section of lower axle with a section of standard attached. Fig. 7 is a side section of levers, axle, and couplers. Fig. 8 is a part of front bearing-plate, showing under side. Fig. 9 is the rear bearing-plate, showing under side. Fig. 10 is a part of rear bearing-plate with a section of Y-strut and hinge-jointed standard. Fig. 11 is an end view of the same.

Similar letters refer to similar parts throughout the several views.

The table or bed T, its truss-rods $T^r$, and front end rail $R'$, and hinge-jointed standards $S S S' S'$, joined to the under side of table or bed T by means of bearing-plates $B' B'$. The standards $S S S' S'$ are joined in pairs at lower ends by axles $A A'$, and centrally between this and bearing-plate $B' B'$ by axle $A^x A^{x\prime}$. The distance between the axles $A^x$ and $A^{x\prime}$ is fixed by the tie-coupling $c$, and the lower axles $A A'$ are kept at a fixed distance from each other by the stays $t\ t$. The standards $S S S' S'$ have an oblong slot at their lower end, and the axle $A A'$ has a tenon which fits into this slot, causing the standards $S S S' S'$ to partake of whatever motion may be given to the axle $A'$. The front axle $A'$ is fixed to a lever M L, and the arm L is knuckle-jointed to the single end of Y-strut Y Y, the other ends of which are joined by an axle-pin to the rear bearing-plate $B'$. As may be seen, by pressing the lever M, Fig. 2, downward the front axle $A'$ is turned, thereby raising the joint J of front standards $S' S'$, and with it the upper axle $A^{x\prime}$, giving tension to the tie-coupling $c$, which draws correspondingly on the rear upper axle $A^x$. At the same time the arm L of lever M L presses the strut Y Y against the upper ends of rear standards S S, causing them to open, and the bed T contributes this motion to the front standards, causing the bed T to rise in a perpendicular line and remain level, no matter where the load may be placed on the bed T. In front I have a ratchet R, Fig. 7, by means of which the desired elevation may be maintained whenever that may be between the minimum and the maximum heights. When the highest elevation is reached, as in Figs. 1 and 3, by drawing the ratchet from the ratchet-wheel and raising the lever M the joints J J J J are thrown back, while the arm L draws the strut Y Y forward, and it thus causes the bed T to descend in a perpendicular until the standards fold together, as in Fig. 4, and the bed T is at its minimum height. I prefer to assist this lifting power by springs $S^5 S^5$, joining rear axle $A^{x\prime}$ with the strut Y Y, as shown.

To the rear axle A, I attach wheels, and pivot an axle to the tie $m$ in front and under front axle $A'$, to which I attach smaller wheels, and thus make a strong and commodious truck.

Having thus described my invention in such a manner as I believe will enable those skilled in the art of manufacture to which it pertains to understand the same, what I claim as new, and desire to secure by Letters Patent, is—

1. The combination, in an elevating-truck, of hinge-jointed standards $S S S' S'$, bearing-plates $B' B'$, and tie-rod C, substantially as and for the purpose set forth.

2. In an elevating-truck, the combination of axle A', fixed to lever M L, and to standards S' S', jointed to strut Y Y, and having ratchet R, and a trip-wire $n$, run from ratchet to a convenient distance from outer end of lever M, substantially as and for the purposes set forth.

3. In an elevating-truck, the combination of strut Y Y, conveying the force from lever-arm L to rear bearing-plate B', and thence through table T to front bearing-plate B', thus securing a perpendicular elevation of the table T, substantially as set forth.

4. The combination, in an elevating-truck, of axles $A^\times$ $A^{\times\prime}$, connected by tie-rod $c$, and joining the standards S S S' S' at their joints J J J J, thereby making the relative distances between said joints constant and firm, substantially as set forth.

5. In an elevating-truck, the combination of axles A A', held to respective positions relative to each other by tie-bars $t$ $t$, the rear axle carrying rear wheels W W and the rear hinge-jointed standard S S, and the forward one carrying the lever M L and the front hinge-jointed standards S' S', both the lever M L and the hinge-jointed standards S' S' being fixed rigidly to front axle A', all substantially as set forth.

6. In an elevating-truck, the combination of lever-strut Y Y, having assisting-springs $S^5$ $S^5$, joining axle $A^\times$ to center of strut-arms Y Y, all substantially for the purposes set forth.

CLINTON BAILY DE WEESE.

Witnesses:
L. H. McCOMB,
N. C. DE WEESE.